B. OAKES.
FLOOR CONNECTION FOR SANITARY PLUMBING FIXTURES.
APPLICATION FILED JULY 25, 1910.
1,042,465.
Patented Oct. 29, 1912.
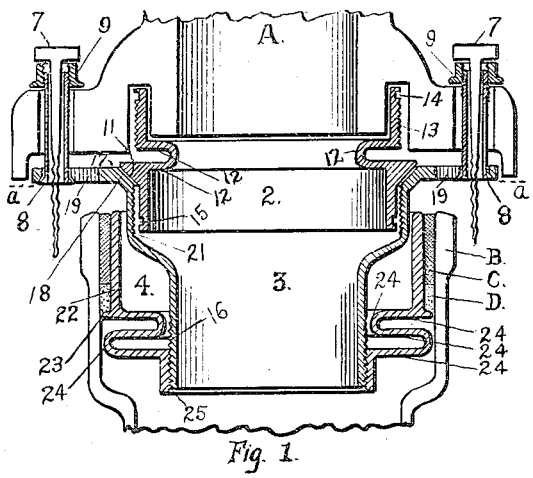
Fig. 1.
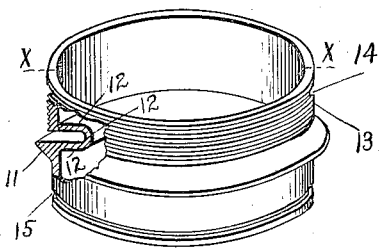
Fig. 2.
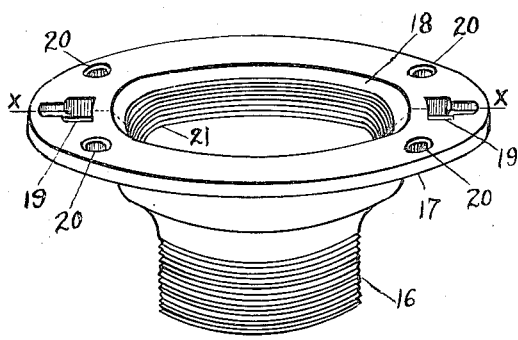
Fig. 3.
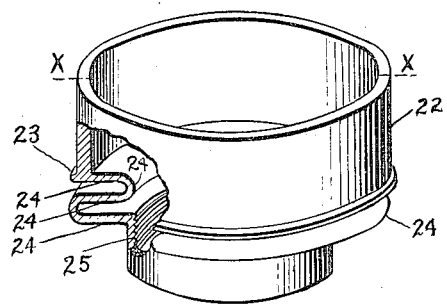
Fig. 4.
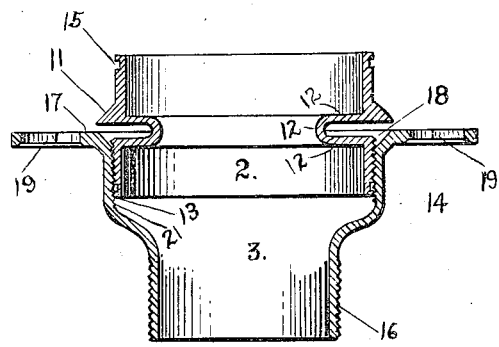
Fig. 5.
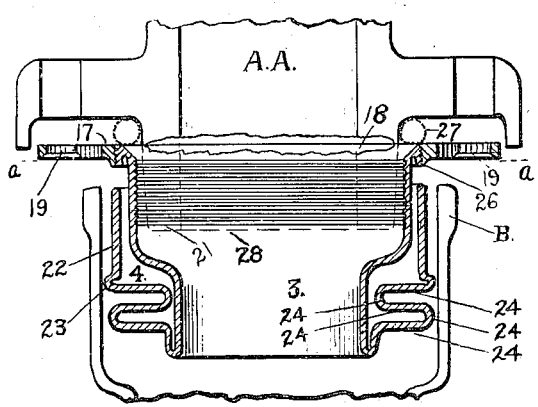
Fig. 6.
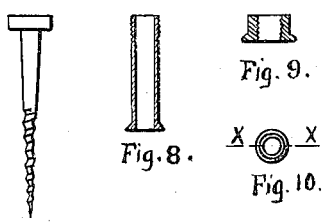
Fig. 7.    Fig. 8.    Fig. 9.
          Fig. 10.
WITNESSES.
Thomas F Norris
Ralph W. Jaynes
INVENTOR.
Ben Oakes

UNITED STATES PATENT OFFICE.

BEN OAKES, OF DETROIT, MICHIGAN.

FLOOR CONNECTION FOR SANITARY PLUMBING-FIXTURES.

1,042,465.

Specification of Letters Patent.

Patented Oct. 29, 1912.

Application filed July 25, 1910. Serial No. 573,696.

*To all whom it may concern:*

Be it known that I, BEN OAKES, a citizen of the United States, residing at Detroit, in the county of Wayne and State of Michigan, have invented a new and useful Floor Connection for Sanitary Plumbing-Fixtures, of which the following is a specification.

This invention relates to flexible connections to be used between the soil or waste pipes of the drainage system in buildings and the water closet, slop sink or other plumbing fixture for the purpose of making a durable connection at the floor line between the fixture and the soil pipe.

The object of my invention is to produce a connection that is so flexible that it will adjust itself for changes due to the settling of the building or shrinking of the floor or twisting of piping, and because of this flexibility will prevent the breaking or opening of the connection or the breaking of the base flange of the closet or opening of apertures at the floor line incident to such settlement or change in the building or the floor thereof.

In carrying out the improvement I employ a short connecting nipple with corrugated walls, of which the corrugations run around the periphery of the short pipe and produce alternate large and small sections of pipe, which are located between the connection of the short pipe and the closet or other plumbing fixture and the second connection of the short pipe to the receiving pipe or soil pipe. Such corrugated nipple is adapted to stretch when the pipe settles and to compress if the floors settle and thus adjust itself to altered conditions of the building in which the closet is placed, and because of its capacity to either stretch or compress, the corrugated nipple of the character described has a capacity to stretch on one side and compress on the opposite side, thus adjusting itself for inequality of settlement and allowing the connecting pipe to bend to compensate for such inequality. With the corrugated nipple connection provision is also made whereby the fixture may be removed at any time without injury thereto and without injuring either connection or soil pipe. The connection may be used with any common or ordinary commercial bowl or with a plumbing fixture having the special base, which is hereinafter described. The connecting pipe is arranged to be joined to the plumbing fixture by either a ground joint, packed joint or gasket packed joint as may be desired. The short pipe is arranged to be connected with the soil pipe by packed joint, and the fixture itself is to be held to the floor, by lag screws that pass through hollow bolts by means of which the connecting pipe is held to the fixture, the means of holding the connecting pipe to the fixture being independent of either the screw joint, the ground joint or the packed joint herein referred to.

The invention is embodied in the device shown and described in the accompanying drawings, in which, Figure 1, is a vertical cross section showing the bottom of a bowl, the top of a soil pipe and the connection between the two. Fig. 2, is a perspective of the pipe connection. One side of Fig. 2 is cut away to show prominently the corrugations therein. Fig. 3, is a perspective showing one member of the two-piece connection. Fig. 4, is a perspective of another part of the two-piece connection. Fig. 5, is a vertical cross section of the member shown in Fig. 3, with which is connected a flexible nipple adapted to be secured directly to the bowl or similar plumbing fixture. Fig. 6, is a vertical cross section shown as made in one piece the two members 3 and 4. In this drawing the flange shown in Fig. 3 is made as a separate piece for purposes that will be explained. Fig. 7, is an elevation of the lag screw. Fig. 8, is a vertical cross section of a hollow bolt. Fig. 9, is a vertical cross section of the nut used with the bolt of Fig. 8. Fig. 10, is an end view of the hollow bolt.

The plumbing fixture is provided with a flanged piece A through which there are holes for the passage of the bolts by which the fixture is secured to the flange.

The soil pipe with which the fixture is to be connected is indicated at B; into this the ring or rigid part 22 of the flexible coupling is connected by any suitable means as by calking C placed over an oakum packing D. The connecting pipe is made with a member 3 provided with a flaring or expanded mouth in which engages a nipple 2 that is secured to the bowl; the member 3 is also secured to an external tube section 4 of flexible tubing and is also provided with an expanded part adapted to engage quite closely within the mouth of the soil pipe B. The nipple 2 is provided between its extremities with an annular groove or corrugation 12 that makes it flexible, and on its external surface with a collar 11 arranged for close connection, preferably by means of a ground joint with the member 3 in which the collar 11 engages making a tight joint at the entrance into the expanded mouth of the member 3. The nipple 2 is preferably screw threaded on one end externally and is provided at each end with a packing groove indicated at 14 on the upper end in Fig. 1 and at 15 in the lower end in Fig. 1. This nipple is to be cemented into a groove formed in the bottom of the bowl. The nipple 2 is adapted to be used with either end engaging in the bowl; its use in one position is shown in Fig. 1 and in the reverse position in Fig. 5. One end is externally threaded to engage with internal threads 21 at the mouth of the member 3. The nipple is also provided intermediate its ends with a collar 11 finished with a ground joint to engage a counter surface 18 in the mouth of the member 3; if the ground joint connection is desired the threaded end is engaged in a groove in the bottom of the bowl A; if a screw joint connection is desired the nipple is reversed; in either case the corrugation 12 affords the elasticity desired.

In case it is desired to use the joint coupling with the ordinary construction of bowl the nipple 2 is not used, but the delivery end of the fixture is inserted in the expanded mouth of the member 3 and the joint between the fixture and the member 3 is packed by gasket 27 which surrounds the delivery end of the fixture and is forced by pressure of the bolts by which the fixture is secured to the flange into the annular groove between the delivery end of the fixture and the mouth opening of the member 3. The members 3 and 4 are preferably made in two parts secured together by threading externally the contracted end of the member 3 and internally the contracted end of the member 4 and screwing the member 3 into the member 4. If made in a single piece as is shown in Fig. 6 the connection is integral. The member 4, between that end of it which is connected with the member 3 and that end of it which is provided with the packing surface 22 is provided with a corrugated portion preferably with one internal groove and one external groove making a double corrugation 24, which will afford a sufficient movement for any change in the relative position of the bowl and the pipe, that may occur from settling or shrinkage. The member 3 is provided at its upper end with an external flange 17 adapted to engage on the floor of the building. This flange may be integral with the body of the part as shown in Fig. 1 or it may be made as a separate part and secured thereto by screw threads as shown in Fig. 6. The latter form affords access to the opening between the soil pipe B and the packing surface 22 for the insertion in this opening of the ordinary oakum and lead packing frequently used to secure pipe ends together. The flange 17 is provided with holes 19 in which are inserted from below hollow bolts 8, the heads of which are countersunk to allow the bolt to engage in the flange with one part projecting below the flange and with the under surface of the flange in condition to engage closely against the floor. These hollow bolts project through holes in the foot of the fixture A and the fixture is secured to the flange by means of hollow nuts 9 that run on the external threaded end of the hollow bolt 8, lag screws 7 are then inserted through the hollow bolts into the floor and hold the fixture securely in place. Other holes 20 in the flange 17 may be used to secure the coupling directly to the floor.

The essential feature of the invention is found in the flexible coupling 3—4 having the smooth interior conduit, the packing surface 22 and the flexible connection between the two, the one part being adapted for fastening to the floor and the other part being adapted for fastening to the soil pipe; the nipple coupling 2 adds a useful adjunct, but one which is not essential to the result.

What I claim is:—

1. A floor connection for plumbing fixtures having in combination a member provided with circumferential corrugations whereby it is made flexible, a packing support, a packing surface 22 of smaller diameter than the packing support, an internal conductor member secured to the corrugated member and provided with an expanded receiving end adapted to engage a nipple and also provided with a flange perforated with bolt holes, substantially as described.

2. A floor connection for plumbing fixtures, having in combination a corrugated member and means for connecting the same by packed joint to a soil pipe, an internal conductor member provided with a receiving end and a floor flange surrounding said receiving end, a nipple adapted to be secured to the fixture provided with a groove whereby it is made flexible and provided with means for engaging with said internal conductor member of said flexible joint, substantially as described.

3. The combination of a flexible joint member, having a perforated flange adapted to rest upon the floor, a plumbing fixture having a bolt hole, a hollow bolt adapted to be inserted from the floor side of the flange through the perforation and the bolt hole, a nut adapted to run on the fixture end of the bolt and secure the flange and fixture together, and a lag screw adapted to pass through the hollow bolt and into the floor, thereby securing both the flexible joint member and the fixture to the floor.

4. A floor connection comprising a tubular member provided with an annular groove intermediate its ends whereby it is rendered flexible and with a collar intermediate its ends and external to said tube adapted to engage with a seat, said tubular member being provided at each end with means for holding packing, substantially as described.

5. A floor connection, a tube provided with circumferential corrugations, a packing surface at one end external to said tube, a bead adapted to form the bottom of a packing chamber, a reduced terminal at the other end of said tube, an internal tube engaging said corrugated tube at said reduced end provided with a flange at the opposite end extending over and beyond said packing surface and adapted to engage the floor between said flange and said packing surface terminal, substantially as described.

6. A floor connection for plumbing fixtures, having in combination a soil pipe, a flexible corrugated member adapted to connect with the soil pipe, an internal conductor member adapted to be secured to the corrugated member, and provided with a flange adapted to rest on the floor, a plumbing fixture and a flexible corrugated nipple adapted to connect the plumbing fixture with the internal conductor member, substantially as described.

7. A floor connection for plumbing fixtures, having in combination, a soil pipe, a flexible corrugated member adapted to connect with the soil pipe and an internal conductor member adapted to be secured to the corrugated member and provided with a flange adapted to rest on the floor, a plumbing fixture, a flexible corrugated nipple adapted to connect the plumbing fixture and the conductor member and invertible to afford a screw joint or a ground joint with the conductor member, as desired, substantially as described.

BEN OAKES.

Witnesses:
THOMAS F. NORRIS,
RALPH W. JAYNES.